United States Patent [19]
Kuhl

[11] 3,740,080
[45] June 19, 1973

[54] CUSHIONED HOOK FOR A PUSH-PULL TYPE VEHICLE COUPLING

[75] Inventor: Bernard A. Kuhl, Cleveland, Ohio

[73] Assignee: General Motors Corporation, Detroit, Mich.

[22] Filed: Nov. 10, 1971

[21] Appl. No.: 197,316

[52] U.S. Cl. .................. 280/481, 280/504
[51] Int. Cl. ............................. B60d 1/04
[58] Field of Search............. 280/481, 498, 504

[56] References Cited
UNITED STATES PATENTS
2,997,798  8/1961  Ruth ........................ 280/481
3,243,203  4/1966  Hermiz ..................... 280/481
3,434,738  3/1969  Campbell .................. 280/481

FOREIGN PATENTS OR APPLICATIONS
1,208,199  12/1965  Germany ................... 280/504

Primary Examiner—Leo Friaglia
Attorney—J. L. Carpenter and E. J. Biskup

[57] ABSTRACT

A cushioned hook adapted to be mounted to the rear of a vehicle for providing a pulling connection with a trailing vehicle. The cushioned hook includes a lever member supported for pivotal movement and having an upper portion formed as a hook and a lower portion adapted to engage a resilient bumper when the hook is connected to the trailing vehicle.

6 Claims, 6 Drawing Figures

PATENTED JUN 19 1972

CUSHIONED HOOK FOR A PUSH-PULL TYPE VEHICLE COUPLING

This invention concerns a cushioned hook which is intended to be mounted on the rear end of an earthmoving scraper and serves as one of the two parts of a push-pull type coupling. Push-pull type couplings are utilized for rapidly connecting and disconnecting scrapers which are operated in pairs during a digging operation. It has been found that by having scrapers work in tandem rather than as separate units, loading time for both scrapers is decreased thereby increasing the overall operating efficiency of each scraper. The push-pull coupling usually consists of a hook portion carried at the rear of a lead scraper and a pusher portion supported by the forward end of the trailing scraper. Initially, the trailing scraper pushes the lead scraper so as to facilitate the loading of the latter. After the lead scraper has been loaded, it then serves to pull the trailing scraper to help load the latter by having its hook portion engage a U-shaped bail of the pusher portion so as to provide the connecting link between the two scrapers.

The present invention contemplates a hook portion which incorporates resilient means for cushioning any jerking type movement that may occur when the lead scraper is pulling the trailing scraper during a loading operation. In the preferred form, the hook portion made in accordance with the invention includes a support frame which is rigidly secured to the rear of a scraper. A hook member in the form of a lever is carried by the support structure for pivotal movement about a horizontal axis that extends transversely to the longitudinal axis of the scraper. Pivotal movement of the hook member is provided by a pivot pin which is connected to the support frame and located between the upper and lower portions of the hook member. The support frame carries a yieldable bumper which is located in axial alignment with the lower portion of the hook member and serves to cushion movement of the hook member when the latter is pivoted in one direction about the pivot pin. The latter movement occurs when the hook member is connected or coupled to the bail of the trailing scraper so as to provide the pulling connection between the scrapers.

The objects of the present invention are to provide a lever type hook which is adapted to be pivotally carried by the rear end of a lead vehicle for connection with a trailing vehicle and cooperates with yieldable means for cushioning the pulling effort between the vehicles; to provide a cushioned hook for a push-pull coupling that is pivotally supported intermediate its ends and is adapted to have the lower portion engage a resilient bumper which serves to absorb shock loads when the hook is being utilized during a pulling operation; and to provide an attachment for the rear end of a lead vehicle that provides the dual function of serving as a hook for pulling a trailing vehicle and also serves as a bumper when the lead vehicle is being pushed and includes resilient means for cushioning shock loads during either of the operations.

Other objects and advantages of the present invention will be more apparent from the following detailed description when taken with the drawings in which.

Figures 1, 2, 3:
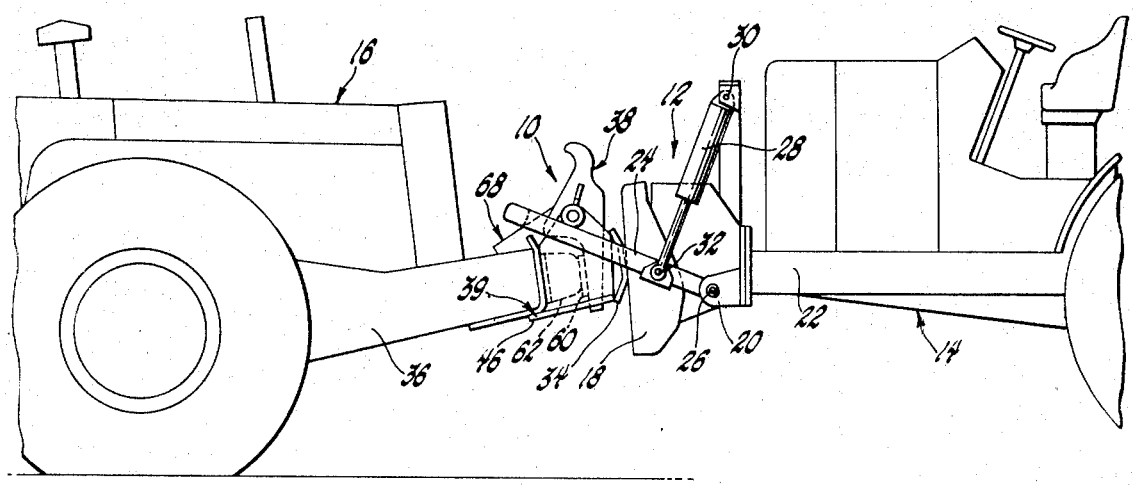
FIG. 1 shows a push-pull coupling arrangement for scrapers that includes a cushioned hook made in accordance with the invention.
FIG. 2 is an enlarged view of the cushioned hook shown in FIG. 1 with some of the parts shown in section.
FIG. 3 is a sectional view of the cushioned hook taken on line 3—3 of FIG. 2.
Figure 4:
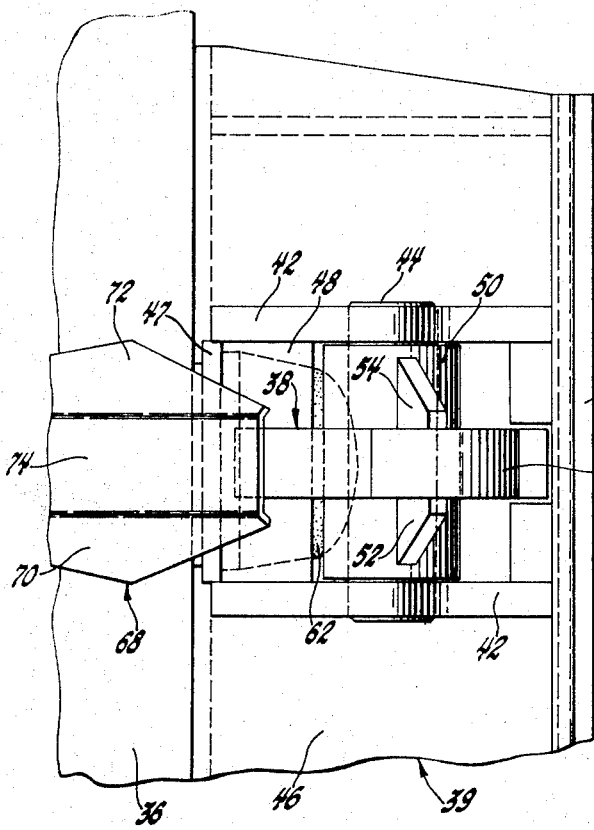
FIG. 4 is a plan view of the cushioned hook taken on line 4—4 of FIG. 2.

Referring to the drawings and more particularly FIG. 1 thereof, a push-pull type coupling is shown which includes a cushioned hook 10 made in accordance with the invention and a pusher portion 12 which is supported at the forward end of a trailing scraper 14. The cushioned hook 10 is attached to the rear end of the front or lead scraper 16 and it will be understood that although not shown both scrapers 14 and 16 include the usual scraper bowls for carrying material cut during a digging operation. As is usually the case, when scrapers are provided with a push-pull coupling of the disclosed type, initially the trailing scraper has the pusher portion thereof engage the rear of the lead scraper and provide a pushing force which facilitates the loading of the latter-mentioned scraper. After the lead scraper has been loaded, it then serves to pull the trailing scraper as the latter is being loaded.

In this regard, it will be noted that the pusher portion 12 includes a push plate 18 that can be pivotally mounted at its upper end to a support 20 rigidly connected with the frame 22 of the trailing scraper 14. A U-shaped bail 24 has its legs pivotally carried by the support 20 for movement about a horizontal axis extending through a pivotal connection 26. An actuator 28, which can be either hydraulically or air operated, has its cylinder end pivotally connected at a point 30 to the scraper and has its piston rod pivotally connected at a point 32 to an intermediate part of the bail 24. Thus, during a digging operation and when the trailing scraper 14 is pushing the lead scraper 16, the push plate 18 engages a rear bumper 34 fixed with the scraper frame 36 of the lead scraper 16 and the bail 24 is positioned over the hook as shown in FIG. 1. When the trailing scraper 14 is being loaded, however, the lead scraper 16 serves to pull the trailing scraper 14 by having the upper end of a hook member 38 engage the bail 24.

The cushioned hook 10 made according to the invention includes a support frame 39 which is rigidly secured to the rear end of the scraper frame 36. The support frame 39 includes the bumper 34 and a pair of upstanding arms 40 and 42 which lie in parallel planes and are laterally spaced a distance sufficient to support a transversely extending pivot pin 44 in a manner as shown in FIG. 3. The arms 40 and 42 are rigidly interconnected by the bumper 34 and transverse brace members 46, 47 and 48 so as to form a rigid structural unit secured to the scraper frame 36.

The hook member 38 takes the form of a lever and has an intermediate portion thereof secured to a transverse cylindrical sleeve 50 which is maintained in position by a pair of gussets 52 and 54. The pivot pin 44 extends through the sleeve 50 and serves as the pivotal support for the hook member 38. It will be noted that the hook member 38 has the upper portion 56 formed with a J-shaped hook and has the lower portion 58 rigidly formed with a round contact plate 60. A generally cylindrical bumper 62 made from an elastomeric material such as rubber or polyurethane is secured to the brace member 47 by a pair of bolts 64 and 66 and is located in axial alignment with the contact plate 60 carried by the hook member 38. Thus, it should be apparent that as seen in FIG. 2, any pivotal movement of the hook member 38 in a clockwise direction about the pivot pin 44 causes the contact plate 60 to engage and compress the bumper 62. Thus, when the lead scraper 16 is pulling the trailing scraper 14, any jerking movement that may occur between the scrapers is cushioned by the bumper 62.

It will be noted that the cushioned hook 10 described above also includes a guide bracket 68 having a pair of side walls 70 and 72 and an integral top wall 74 that is inclined upwardly toward the hook member 38 as seen in FIG. 2. The lower edges of the side walls 70 and 72 are rigidly secured to the scraper frame 36 and are located in positions so as to straddle the hook member 38 and prevent any significant interference with the pivotal movement of the hook member 38. As should be apparent, the top wall 74 of guide bracket 68 serves as a support for the bail 24 when the trailing scraper 14 is pushing the lead scraper 16 and also serves to guide the bail 24 into engagement with the upper portion 56 of the hook member 58 when the lead scraper 16 starts to accelerate and begins to pull the trailing scraper 14.

Figure 5:
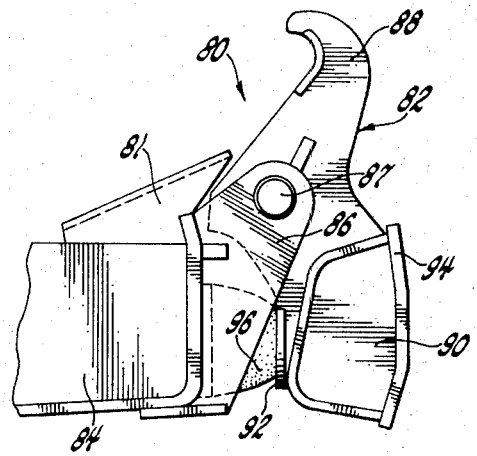
FIG. 5 shows a modified form of the cushioned hook shown in FIGS. 1 through 4.

FIG. 5 shows another form of the cushioned hook disclosed in FIGS. 1 through 4. The modified cushioned hook, which is generally indicated by the numeral 80, also includes a guide bracket 81 and a hook member 82 which is pivotally connected to the frame 84 of a scraper at the rear end thereof by a pair of laterally spaced upstanding arms, one of which is indicated by the reference numeral 86. The hook member 82 is pivotally carried by a pivot pin 87 and has the upper portion 88 thereof also formed with a J-shaped hook and the lower portion 90 provided with a round contact plate 92 similar to that incorporated with the cushioned hook 10. One difference in the cushioned hook 80 is that the lower rear edge of the hook member 82 is rigidly formed with a transverse bumper plate 94 which can be engaged by the pusher plate of the trailing scraper. As with the cushioned hook 10, however, a resilient bumper 96 is carried by the scraper frame 84 in axial alignment with the contact plate 92. Thus, it can be seen that the modified cushioned hook 80 provides a dual cushioning function in that shock loads are absorbed by the resilient bumper 96 when the lead scraper is being pushed and also when the lead scraper is being used for pulling the trailing scraper.

Figure 6:
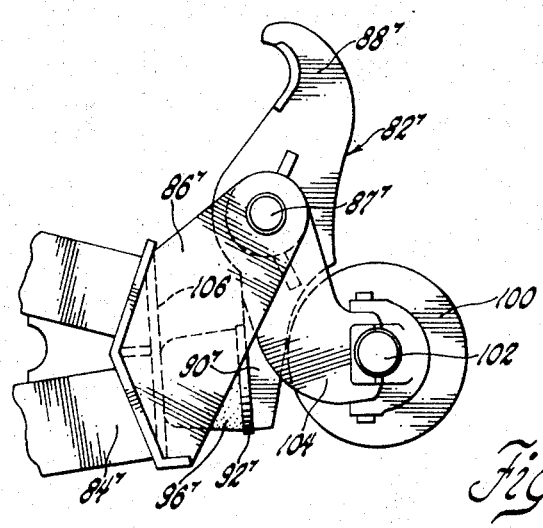
FIG. 6 shows another modified form of the cushioned hook shown in FIGS. 1 through 4.

FIG. 6 shows another version of a cushioned hook and, in this regard, it will be noted that all parts corresponding to those incorporated with the cushioned hook 80 of FIG. 5 are identified by the same numerals but primed. One principal difference between this hook structure and that shown in FIG. 5 is that the bumper plate 94 is replaced by a roller 100 which is adapted to rotate about a transverse horizontal axis passing through the center of a support pin 102 supported by laterally spaced legs which are rigid with the upper portion 88' of the hook member 82'. Only one leg is shown in FIG. 6 and it is identified by the numeral 104. As with the hook member 82, the lower portion 90' of the hook member 82' is secured to a round plate 92', but in this case, the plate 92' rigidly carries a resilient bumper 96' which is adapted to contact a plate 106 fixed with the frame 84' when the hook member 82' pivots in a clockwise direction about pin 87'. Accordingly, as in the case of the FIG. 5 hook structure, the cushioned hook of FIG. 6 serves to resiliently absorb shock loads during both the pulling operation and also the pushing operation. An additional feature is that by utilizing the roller 100 mounted at the rear end of the lead scraper, any movement of the push plate in a vertical direction, as frequency occurs when scrapers are moving over uneven ground, causes the roller 100 to rotate about its support axis. Thus, frictional drag between the two scrapers as they move in a vertical direction relative to each other is minimized and loading is facilitated.

Various changes and modifications can be made in this construction without departing from the spirit of the invention. Such changes and modifications are contemplated by the inventor and he does not wish to be limited except by the scope of the appended claims.

I claim:

1. A cushioned hook adapted to be mounted to the rear of a vehicle having a frame for providing a pulling connection with a trailing vehicle, comprising a support member rigidly secured to said frame, a hook member having an upper portion and a lower portion, said hook member carried by said support member for pivotal movement about a horizontal axis that extends transversely to the longitudinal axis of the vehicle and is located between said upper and lower portions, said upper and lower portions being located in a vertical plane parallel to said horizontal axis, resilient bumper means supported between the frame and said lower portion below said horizontal axis and in the path of movement of said lower portion for directly cushioning movement of the hook member when the latter is pivoted in one direction above said horizontal axis, and a hook formed on said upper portion above said horizontal axis and adapted to be coupled to said trailing vehicle so as to provide said pulling connection and cause said hook member to pivot in said one direction and be cushioned by said resilient bumper means.

2. The cushioned hook of claim 1 wherein said lower portion has a trailing edge formed with a rigid bumper which is adapted to be engaged by said trailing vehicle for pivoting said hook member in said one direction.

3. The cushioned hook of claim 1 wherein said hook member supports a roller for rotation about a transverse axis which is located below said horizontal axis and is parallel thereto.

4. The cushioned hook of claim 1 wherein said resilient means is an elastomeric member secured to said lower portion of the hook member.

5. A cushioned hook adapted to be mounted to the rear of a vehicle having a frame for providing a pulling connection for a bail carried by a trailing vehicle, comprising a support member having a pair of laterally spaced upstanding arms rigidly secured to said frame, a hook member positioned between said arms and having an upper portion and a lower portion, pivot means connecting said hook member to said support member for pivotal movement about a horizontal axis that extends transversely to the longitudinal axis of the vehicle and is located intermediate the ends of said hook member, a yieldable bumper mounted on the frame below said horizontal axis in axial alignment with said lower portion and serving to cushion movement of the hook member when the latter is pivoted in one direction above said horizontal axis, a guide bracket rigidly connected to said frame forwardly of said hook member, an inclined upper surface on said guide bracket for guiding said bail into engagement with said hook member, and a hook formed on said upper portion above said horizontal axis and adapted to be engaged by the bail carried by said trailing vehicle so as to provide said pulling connection and cause said hook member to pivot in said one direction.

6. A cushioned hook adapted to be mounted to the rear of a vehicle having a frame for providing a pulling connection for a bail carried by a trailing vehicle, comprising a support member having a pair of laterally spaced upstanding arms rigidly secured to said frame, a hook member positioned between said arms and having an upper portion and a lower portion, pivot means connecting said hook member to said support member for pivotal movement about a horizontal axis that extends transversely to the longitudinal axis of the vehicle and is located intermediate the ends of said hook member, a yieldable bumper mounted on the frame below said horizontal axis in axial alignment with said lower portion and serving to cushion movement of the hook member when the latter is pivoted in one direction above said horizontal axis, a guide bracket rigidly connected to said frame forwardly of said hook member for guiding said bail into engagement with said hook member, and a hook formed on said upper portion above said horizontal axis and adapted to be engaged by the bail carried by said trailing vehicle so as to provide said pulling connection and cause said hook member to pivot in said one direction.

* * * * *